United States Patent [19]

Parthasarathy et al.

[11] 3,929,620

[45] Dec. 30, 1975

[54] HYDROCRACKING CATALYST AND PROCESS

[75] Inventors: R. Parthasarathy, Silver Spring; Julius Scherzer, Columbia, both of Md.

[73] Assignee: W. R. Grace & Co., New York, N.Y.

[22] Filed: Dec. 4, 1974

[21] Appl. No.: 529,679

[52] U.S. Cl. ............... 208/111; 208/216; 252/430; 252/455 Z
[51] Int. Cl.² C10G 13/06; B01J 27/04; B01J 29/12
[58] Field of Search .................................. 208/111

[56] References Cited
UNITED STATES PATENTS

| | | | |
|---|---|---|---|
| 3,271,418 | 9/1966 | Plank et al. | 208/120 |
| 3,293,192 | 12/1966 | Maher et al. | 252/430 |
| 3,393,147 | 7/1968 | Dwyer et al. | 423/328 |
| 3,644,200 | 2/1972 | Young | 208/120 |
| 3,677,972 | 7/1972 | Gutberlet et al. | 252/455 Z |
| 3,783,123 | 1/1974 | Young | 208/111 |
| 3,830,724 | 8/1974 | Schutt | 208/111 |
| 3,836,454 | 9/1974 | Hansford | 208/111 |

*Primary Examiner*—Herbert Levine
*Assistant Examiner*—G. E. Schmitkons
*Attorney, Agent, or Firm*—Joseph P. Nigon

[57] ABSTRACT

A process for hydrocracking hydrocarbon stocks by contacting such stocks under hydrocracking conditions with a nickel oxide-tungsten oxide catalyst distended on an ultrastable faujasite base that has been exchanged to incorporate chromium oxide therein. The use of this catalyst allows the refiner to hydrocrack feedstocks that contain large quantities of sulphur and nitrogen compounds. The use of the specially prepared chromium zeolite base also increases the life of the catalyst.

5 Claims, No Drawings

HYDROCRACKING CATALYST AND PROCESS

BACKGROUND OF THE INVENTION

In recent years a large part of the effort in catalytic hydrocracking has been directed to the development of catalysts for converting gas oils to products boiling in the gasoline range. The best catalysts for converting light middle distillates boiling in the 300°–700°F. range to gasoline are those comprising a highly active cracking base such as a crystalline zeolite, for example, combined with a highly active hydrogenation components such as palladium or platinum. These catalysts however, are proven to exhibit high initial deactivation rates in the presence of ammonia and hydrogen sulfide generated by organic nitrogen and sulfur contaminated feedstocks.

In order to achieve acceptable run lengths between regenerations, the prior art in catalytic hydrocracking involved operation at lower temperatures with attendant low conversions per pass and consequent poor product selectivity and quality. Techniques such as accelerated coking with "sweet" feeds to pre-condition the catalyst were also used to enable permissable run lengths at substantially constant temperature levels and to produce constant quality products.

BRIEF DESCRIPTION OF THE INVENTION

We have found that a highly active and selective catalyst for hydrocracking light middle distillates that contain large amounts of nitrogen and sulphur compound to gasoline range products can be prepared by depositing a Group VI-B metal, metal oxide, or sulfide on an ultrastable, large pore, crystalline aluminosilicate material containing less than about 1% alkali metal wherein the aluminosilicate has been exchanged to convert it to the chromium form. The base should have deposited therein from about 0.1 to 10 wt. percent of the Group VI-B metal oxide or sulfide, preferably in combination with a Group VIII metal oxide, such as nickel oxide. The preferred catalyst is a mixed nickel oxide, tungsten oxide on a chromium exchanged ultrastable aluminosilicate base.

DETAILED DESCRIPTION OF THE INVENTION

The preferred hydrocracking catalyst of our invention consists of an ultrastable, large pore, crystalline aluminosilicate material containing less than 1% alkali metal that has been previously exchanged to convert it to the chromium form and having deposited thereon from about 0.01 to 10 wt. percent nickel oxide and about 10 to 25 wt. percent tungsten oxide, wherein the metals are in the form of nickel oxide and tungsten oxide. The catalyst of this invention may be combined with about 5 to 50% of another porous metrix. The nickel oxide and tungsten oxide are the sole hydrogenationdehydrogeneration agents. The chromium exchanged ultrastable aluminosilicate base contains about 1 to 3 percent chromia as $Cr_2O_3$.

The ultrastable, large pore, aluminosilicate material that is exchanged with the chromium salt is extremely important. It is an ultrastable material that is stable to exposure to elevated temperatures and stable to repeated wetting and drying cycles. This crystalline aluminosilicate meterial is described as Z-14 ultrastable zeolite in U.S. Pat. No. 3,293,192 to Maher and McDaniel. Its X-ray diffraction pattern along with the description of the method of measurement is presented in U.S. Pat. No. 3,293,192.

The stability of the ultrastable, large pore, crystalline aluminosilicate material may be demonstrated by its surface area after calcination at 1725°F. After a 2 hour calcination at 1725°F, a surface area that is greater than 150 square meters per gram is retained. Moreover, the stability is further demonstrated by its surface area after a steam treatment with an atmosphere of 25% steam at a temperature of 1525°F. for 16 hours. The surface area after this steam treatment is greater than 200 m.$^2$/gm.

The ultrastable, large pore, crystalline aluminosilicate material exhibits extremely good stability towards wetting, which is defined as the ability of a particular aluminosilicate material to retain surface area or nitrogen adsorption capacity after contact with water or water vapor. A form of the ultrastable, large pore, crystalline aluminosilicate material containing about 2% sodium exhibits a loss in nitrogen adsorption capacity that is less than 2% per wetting when tested for stability to wetting.

The ultrastable, crystalline aluminosilicate material is a large pore material. By large pore material it is meant, material that has pores which are sufficiently large to permit the passage thereinto of benzene molecules and larger molecules and the passage therefrom of reaction products. For use in hydrocracking processes, it is preferred to employ a large pore, crystalline aluminosilicate material having a pore size of at least 8 to 10 angstrom units. The ultrastable crystalline aluminosilicate possesses such a pore size.

The cubic unit cell dimensions of the ultrastable, large pore, crystalline aluminosilicate material is within the range of about 24.20 angstroms to about 24.45 angstroms. This range of values is below those values shown in the prior art for the faujasites defined as Type-X and Type-Y aluminosilicates.

The ultrastable, large pore, crystalline aluminosilicate material, prior to the exchange with solutions of salt of chromium contains less than 1 wt. percent alkali metal such as sodium, and after exchange contains less than 0.5 wt. percent alkali metal.

As pointed out previously, the hydrocracking catalyst of our invention demonstrates a high degree of activity and stability in the catalytic hydrocracking of organic sulphur and nitrogen containing feeds. The catalyst was found to be surprisingly more active and especially maintain its activity over a longer period of time without discernable deactivation as compared with the low soda version of a commercial type noble metal hydrocracking catalyst based on a magnesia containing crystalline aluminosilicate promoter.

A catalyst prepared where the noble metal was substituted for the nickel and tungsten components also retained its stability toward deactivation.

As pointed out above, the process of preparing the ultrastable aluminosilicate is not part of this invention. The chromium component is incorporated into the zeolite by slurrying the zeolite with a solution of a soluble chromium salt, such as chromium bromide, chromium chloride, chromium nitrate, etc. (Chromium chloride is the preferred salt.)

After exchange is complete, the zeolite is separated from the solution, washed and dried.

If desired, the chromium exchanged zeolite may be mixed with an amorphous silica-alumina catalyst having an alumina content of about 28%. The zeolite alone, or the blend, is then impregnated with soluble salts of nickel and tungsten to prepare the final catalyst. In the preferred process, the nickel is added as nickel nitrate, and after the impregination with the nickel nitrate the material is dried and reimpregnated with an ammonium metatungstate solution The composite is then mixed with a commercially available pilling aid, pilled to ⅛ inch pills and calcined.

Our invention is illustrated by the following specific, but not limiting examples.

EXAMPLE 1

This example describes a method of preparing the hydrocracking catalyst of this invention.

A commercially available faujasitic type aluminosilicate, having a silica to alumina ratio of 4.85, a sodium oxide content of 9.6% and a surface area of 880m²/gm., was partially ammonium exchanged with ammonium sulfate in solution until the sodium content was reduced to about 3%. The material was washed, filtered and calcined at 1400°F. for 3 hours in a muffle furnace. The calcined zeolite was then again ammonium exchanged until the sodium content dropped to about 0.3% Na₂O. The resulting product is an Ultrastable Faujasitic Zeolite. The ultrastable zeolite was exchanged with chromium by slurrying 125 ml (dry basis) of the zeolite and 375 ml, of water, then 125 ml of a chromium chloride solution containing 6.9 gm. of chromium was added. The pH of the resulting slurry was adjusted to 3.5 with approximately 6 normal hydrochloric acid.

The mixture is heated to 195°F. under stirring and kept at that temperature for a period of 1 hour, at the end of this time the slurry was filtered, the filter cake was washed chloride free and dried at 220°F. for 2 hours. The zeolite at this stage contained 1.2% $Cr_2O_3$, 0.2% $Na_2O$, and had a surface area of 745 m²/g. after calcination at 1000°F. for 2 hours.

The catalyst was prepared by blending 57.4 g. of the partially chromium exchanged zeolite with 24.8 g. of an amorphous silica-alumina cracking catalyst containing 28% alumina in a ball mill for 2 hours. The blend was then impregnated with a nickelous nitrate solution to give an NiO content of 6% in the final composition. The material was dried and impregnated with ammonium meta-tungstate solution to give 18% tungsten oxide in the final composition.

The composition was dried, blended with 4% of a commercially available pilling aid and pilled to ⅛ inch pills. The pills were calcined for 3 hours at 1000°C.

EXAMPLE 2

The hydrocracking catalyst of Example 1 was used to hydrocrack a hydrorefined light catalytic cycle oil to which sulfur was added as thiophene and nitrogen as N-butylamine to simulate $H_2S$ and $NH_3$ partial pressures in the catalyst reaction zone. The operating conditions used and the results obtained using this catalyst were compared with a low soda version of commercially available hydrocracking catalyst promoted with a magnesium containing faujasite. The doped feed contained 1% sulphur as thiophene and 1000 ppm of nitrogen as N-butylamine. The feed had an API gravity of 0f 35.6. The boiling range of the feed is set out in the table below.

| BOILING RANGE in °F | |
|---|---|
| Initial Boiling Point | 408 |
| 5% | 437 |
| 10% | 449 |
| 50% | 499 |
| 95% | 580 |
| Final Boiling Point | 605 |

The unit was operated at a liquid hourly velocity of 1.0, of pressure of 1500 psig and a hydrogen feed of 8000 standard cubic feet per barrel.

Data comparing the chromium promoted zeolite with a magnesium promoted zeolite is set out in the table below.

| Catalyst: | A | B |
|---|---|---|
| Promoter type (faujasite) | Cr-ultrastable | Mg- |
| % Promoter | 70 | 80 |
| % $Cr_2O_3$ or MgO | 1.19 | 2.31 |
| % $SiO_2/Al_2O_3$ | 30 | — |
| % $Al_2O_3$ | — | 20 |
| % $Na_2O$ | ~0.2 | ~0.2 |
| % NiO | 6 | — |
| % $WO_3$ | 18 | — |
| % Pd | — | 0.5 |
| Catalyst age hrs | 160 | 105 |
| Age rate °F/day | — | 0.5 |
| *Activity °F | 648 | 653 |
| Dry gas wt% | 0.80 | 1.13 |
| Light Naphtha vol % ($C_6$ - 180°F) | 8.8 | 9.0 |
| Heavy Naphtha (180 – 430°F) | 86.3 | 84.3 |
| $C_5$+ vol % | 100.1 | 99.5 |

*Activity is temperature required for 50% conversion to materials boiling below 430°F.

It is obvious that the cromium containing catalyst containing lower amounts of faujasite promoter and non-noble metal hydrogenation components is more active than the magnesium faujasite promoted noble metal composition after longer aging time. Although the magnesium faujasite based catalyst shows good initial activity, the catalyst is more unstable and deactivates rapidly, as is shown by the age rate of 0.5°F. per day. In addition, the chromium promoted catalyst is more selective and prepares a larger percentage of heavy naptha and a smaller percentage of dry gas.

EXAMPLE 3

This example demonstrates superiority of the noble metal catalyst using the chromium containing ultrastable faujasite promoter over commercial palladium, magnesium faujasite promoted catalyst. The feedstock uses the same as a feedstock used in Example 1. The unit was operated under the same conditions. The data collected in the comparative runs are set out in the table below.

| Promoter (faujasite) | 80% Cr-ultrastable | 80% Mg-* |
|---|---|---|
| % $Al_2O_3$ | 20 | 20 |
| % $Cr_2O_3$ or MgO | 1.78 | ~3.0 |
| % $Na_2O$ | ~0.2 | 1.08 |
| Activity °F | 655 | 666 |
| Aging rate, °F | nil | nil |
| Dry gas wt % | 0.99 | 1.04 |
| Light Naphtha vol % | 8.0 | 9.6 |
| Heavy Naphtha vol % | 85.5 | 82.8 |
| $C_5$+ vol % | 98.3 | 98.4 |

*Commercial type catalyst

It is evident that a higher Na$_2$O content is required in the commercial type catalyst to achieve aging stability, whereas the catalyst of this invention is more active and more stable at low sodium levels.

What is claimed is:

1. A method of hydrocracking a hydrocarbon feed stock to obtain lower boiling hydrocarbons which comprises subjecting said feedstock to hydrocracking conditions in the presence of a catalyst, said catalyst consisting of about 0.1 to 10 wt. percent nickel oxide, 10 to 25 wt. percent tungsten oxide and from 5 to 80% of a chromium containing ultrastable zeolite having an alkali metal content expressed as the oxide of less than 1 percent, a cubic unit cell of from 24.20 to 24.45 angstroms and an ultrastable structure as evidenced by retention of a surface area of greater than 150 m$^2$/g. after calcination of a temperature of 1725°F. for 2 hours.

2. The method according to claim 1, wherein the ultrastable zeolite contains from about 1 to 3 percent chromia expressed as Cr$_2$O$_3$.

3. The method according to claim 1, wherein the chromium is exchanged into the ultrastable zeolite and the tungsten and nickel oxides are impregnated therein.

4. A method of hydrocracking a hydrocarbon feedstock containing large amounts of sulfur and nitrogen components to obtain lower boiling hydrocarbons which comprises subjecting said feedstock to hydrocracking conditions in the presence of a catalyst, said catalyst consisting of about 0.1 to 10 wt. percent of nickel oxide and 10 to 25 wt. percent tungsten oxide and 5 to 80% of a chromium containing ultrastable zeolite having an alkali metal content of less than 1 percent, a cubic unit cell of 24.20 to 24.45 angstroms and an ultrastable structure as evidenced by retention of a surface area of greater than 150 m$^2$/g. after calcination at a temperature of 1725°F. for a period of 2 hours.

5. The method according to claim 4, wherein the ultrastable zeolite contains 1 to 3 percent chromia expressed as Cr$_2$O$_3$.

* * * * *